E. P. NOYES.
CORN-PLANTER AND CULTIVATOR.
No. 178,551. Patented June 13, 1876.
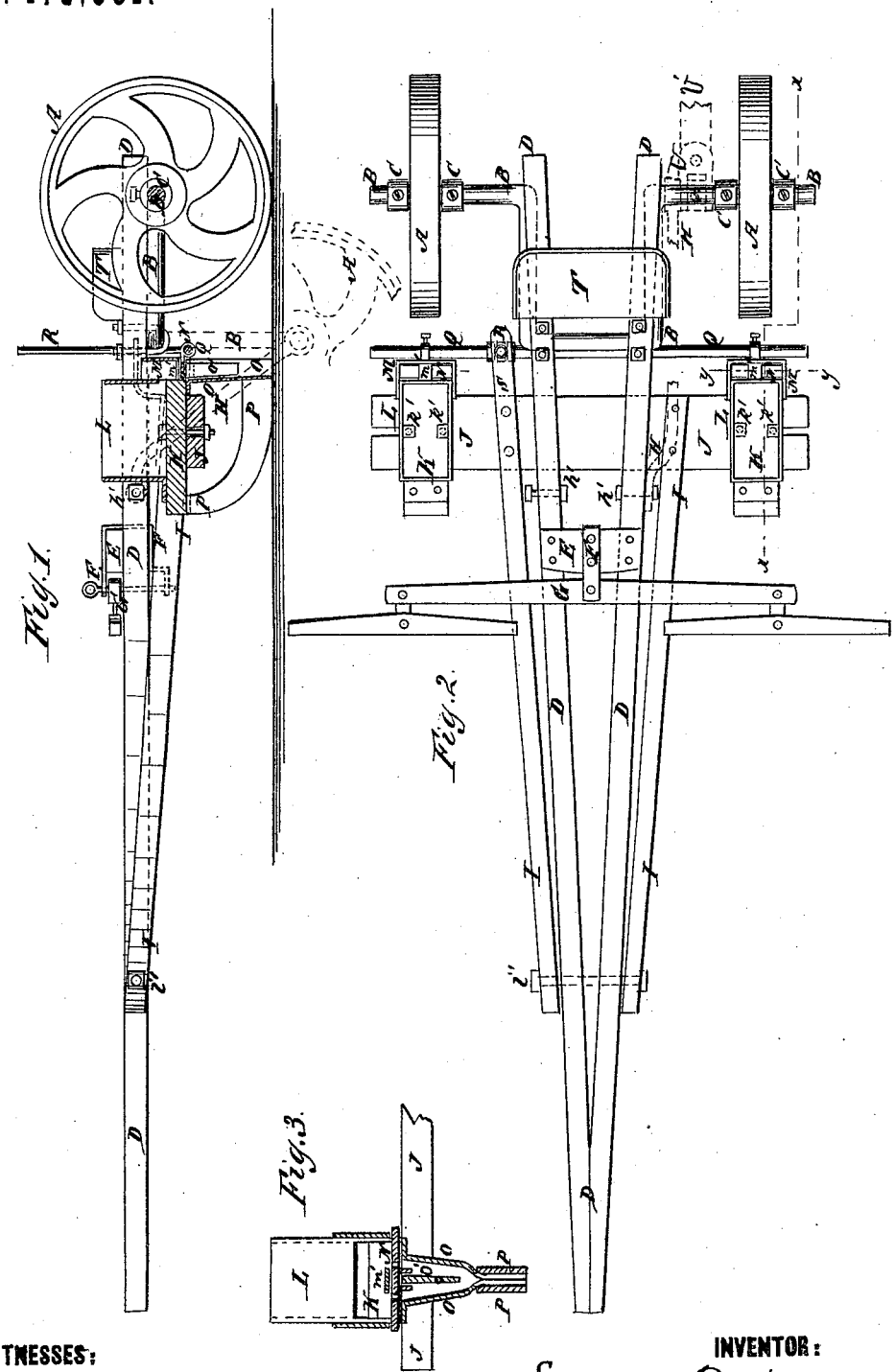
WITNESSES:
E. Wolff
A. F. Terry
INVENTOR:
Edward P. Noyes
BY
Munn &co
ATTORNEYS.

UNITED STATES PATENT OFFICE.

EDWARD PAYSON NOYES, OF SEVILLE, OHIO.

IMPROVEMENT IN CORN PLANTERS AND CULTIVATORS.

Specification forming part of Letters Patent No. 178,551, dated June 13, 1876; application filed August 21, 1875.

*To all whom it may concern:*

Be it known that I, EDWARD P. NOYES, of Seville, in the county of Medina and State of Ohio, have invented a new and useful Improvement in Corn Planter and Cultivator, of which the following is a specification:

Figure 1 is a side view of my improved machine arranged as a planter, partly in section, through the line $x\,x$, Fig. 2. Fig. 2 is a top view of the same. Fig. 3 is a detail cross-section of the hopper, conductor-spout, and runner, taken through the line $y\,y$, Fig. 2.

Similar letters of reference indicate corresponding parts.

The invention will first be described in connection with drawing, and then pointed out in the claims.

A are the wheels, which are made with wide rims, so that they may serve as rollers to press the soil down upon the seed and cover it. The wheels A revolve upon the long journals of the axle B, upon which they are secured adjustably by rings and set-screws C, or by linch-pins. The axle B is bent four times at right angles, as shown in Fig. 2, and its middle horizontal part works in bearings attached to the bars of the tongue D, which is made in V shape, as shown in Fig. 2. The rear parts of the bars of the tongue D are connected and held in their proper relative position by a block, E, to the upper and lower sides of which is attached the hammer-strap F, which is so formed that the double-tree G may be placed above or below the said tongue, according as the machine is to be used as a planter or cultivator. When the machine is to be used as a planter, the rear ends of the bars of the tongue D rest upon the axle B, as shown in Figs. 1 and 2. When the machine is to be used as a cultivator, the bent part of the axle B is turned into an upright position, as shown in dotted lines in Fig. 1, in which position it is held by the brace-bars H, the rear ends of which have eyes formed in them to receive the journals of the axle B. The forward ends of the brace-bars H have holes formed in them to receive the bolts $h'$, by which they are secured to the bars of the tongue D. I are the draft bars or tongue of the planter, the forward ends of which are secured to the opposite sides of the forward part of the tongue D by a bolt, $i'$, as shown in Figs. 1 and 2. The rear ends of the bars I are rigidly attached to a cross-bar or plank, J, the ends of which are slotted longitudinally to receive the bolts $k'$, by which the blocks K are secured to it. L are the seed-hoppers, which are attached to the blocks K. The rear sides of the hoppers L project a little in the rear of the rear ends of the blocks K, and their lower parts are cut away to allow the seed to pass through into the compartment M, formed upon, or attached to, the rear sides of the said hoppers L. The passage of the seed into the compartment M is facilitated by making the upper surface of the blocks K incline toward the said compartment M. The bottoms of the compartments M are closed by the slides N, which work upon the upper ends of the conductor-spouts O, and have two holes formed in them to receive the seed, and convey it into the said conductor-spouts. The slides N are kept from carrying out any more seed than enough to fill their holes by the cut-offs $m'$, which are attached to the lower parts of the compartments M. The upper ends of the conductor-spouts O are secured to the rear ends of the blocks K, and their lower ends enter and are secured in the forked rear ends of the runners P, by which the soil is opened to receive the seed. In the under side of the dropping-slides N are formed sockets to receive the upper ends of the plates $o'$, which pass down through the conductor-spouts O, and are pivoted to said spouts to serve as valves to receive the seed, and drop it to the ground at the next movement of the dropping-slides. The forward ends of the runners P are attached to the forward ends of the blocks K.

By this construction, the planter may be adjusted to plant the rows wider apart or closer together by loosening the nuts of the bolts $k'$, and adjusting the blocks $k$ upon the plank J.

Upon the rear edges of the dropping-slides N are formed eyes to receive the cross-rod Q, to which they may be secured by set-screws or other convenient fastenings, so that the slides N may be operated by operating the said rod Q. To the rod Q is attached the lower end of a lever, R, which passes up through a hole in an arm or bracket, S, attached to one of the bars I, to keep the lever R in position, and serve as a fulcrum to it. The upper end of the lever R extends up into such a position that it may be conveniently reached and operated by a person sitting upon the seat T, attached to the rear part of the tongue D. The driver may walk or may ride upon a seat attached to the rear part of the machine.

When the machine is to be used as a cultivator, the planting device is detached, and the forward ends of the beams are attached to the couplings U, which are placed upon the journals of the axle B, and are secured in place by the rings C.

Having thus described my invention, I claim as new and desire to secure by Letters Patent—

1. The combination of a cultivator-tongue, D, and bent axle B, pivoted thereto, with the detachable corn-planter device, consisting of pivoted side bars I I, cross bar or bars J, carrying droppers L L, bar Q, and handle R, substantially as and for the purpose set forth.

2. The combination of bent axle B, the tongue D on the crank of the axle, braces H H, couplings U U, and rings C C, substantially as and for the purpose set forth.

EDWARD P. NOYES.

Witnesses:
 EMILY NOYES,
 F. J. NOYES.